United States Patent
Ono

(10) Patent No.: US 7,243,260 B2
(45) Date of Patent: Jul. 10, 2007

(54) PROGRAMMABLE CONTROLLER UNIT AND METHOD OF AUTOMATICALLY RESTORING MEMORY

(75) Inventor: Akio Ono, Numazu (JP)

(73) Assignee: OMRON Corporation, Kyoto (JP)

( * ) Notice: Subject to any disclaimer, the term of this patent is extended or adjusted under 35 U.S.C. 154(b) by 488 days.

(21) Appl. No.: 10/745,952

(22) Filed: Dec. 26, 2003

(65) Prior Publication Data

US 2004/0193948 A1     Sep. 30, 2004

(30) Foreign Application Priority Data

Dec. 27, 2002   (JP)   ............... 2002-382444
Dec. 18, 2003   (JP)   ............... 2003-421589

(51) Int. Cl.
*G06F 11/00* (2006.01)

(52) U.S. Cl. ..................................... 714/13
(58) Field of Classification Search ............... 714/13, 714/6, 8, 47, 15, 26
See application file for complete search history.

(56) References Cited

U.S. PATENT DOCUMENTS

| | | | | |
|---|---|---|---|---|
| 4,819,154 | A * | 4/1989 | Stiffler et al. ............... | 714/20 |
| 5,933,595 | A * | 8/1999 | Iizuka et al. ................ | 714/35 |
| 6,343,366 | B1 * | 1/2002 | Okitaka ..................... | 714/733 |
| 6,367,042 | B1 * | 4/2002 | Phan et al. .................. | 714/733 |
| 6,651,138 | B2 * | 11/2003 | Lai et al. ..................... | 711/115 |
| 6,651,202 | B1 * | 11/2003 | Phan ........................... | 714/733 |

FOREIGN PATENT DOCUMENTS

| | | |
|---|---|---|
| JP | 02-059901 | 2/1990 |
| JP | 05-066936 | 3/1993 |
| JP | 08-087429 | 2/1996 |
| JP | 09-081381 | 3/1997 |
| JP | 09-204205 | 8/1997 |
| JP | 2001-209412 | 4/2001 |
| JP | 2002-358104 | 12/2002 |

OTHER PUBLICATIONS

Patent Abstracts of Japan, Publication No. 11-143784, *Display Device For Programmable Controller*, Mochizuki Shingo et al., published on May 28, 1999.
Japan patent application No. 2003-421589, Examination Report dated Feb. 6, 2007.

* cited by examiner

*Primary Examiner*—Nadeem Iqbal
(74) *Attorney, Agent, or Firm*—Beyer Weaver LLP

(57) ABSTRACT

A unit for a programmable controller includes a user program memory storing a user program to be read out for carrying out a calculation process and a backup memory storing data with the same contents as the user program stored in the user program memory. An abnormality detector is provided for detecting a memory abnormality by comparing user data stored in the user memory and the backup memory while the programmable controller is operated. If a memory abnormality is detected, a restoration device repairs the data at the position where the abnormality was detected with the data at the corresponding position of the backup memory and the cyclic operation of the programmable controller is continued thereafter.

12 Claims, 8 Drawing Sheets

PROGRAMMABLE CONTROLLER UNIT AND METHOD OF AUTOMATICALLY RESTORING MEMORY

BACKGROUND OF THE INVENTION

This invention relates to a unit for a programmable controller (PLC) and to a method of automatically restoring a memory.

Programmable controllers are used as a control device in factory automation (FA). Programmable controllers are formed with a plurality of units, or as a suitable combination of various types of units such as a power source unit serving as a supply source of electric power, a CPU unit for controlling the PLC as a whole, an input unit for inputting signals from switches and sensors that are suitably positioned on the production and equipment devices for FA, an output unit for outputting control signals to actuators or the like and a communication unit for connecting to a communication network.

The PLC (or its CPU unit) carries out repeatingly the operations of receiving signals inputted through the input unit into the I/O memory of the CPU unit ("IN refresh"), carrying out logical calculations on the basis of a preliminarily registered user program ("calculation"), transmitting the results of such calculations to the output unit by writing them in the I/O memory ("OUT refresh") and thereafter the so-called peripheral processes. The PLC controls an object to be controlled by repeating such operations.

User programs and set data ("user data") are saved on a RAM and data are read from and written in it sequentially when the calculation process is carried on.

At a factory where the PLC is installed, many kinds of apparatus such as servo motors, inverters and high-voltage power devices are connected to the PLC or disposed near the PLC. Thus, data stored on a memory in the PLC are susceptible to destruction due to radiation noise, instantaneous power failure or magnetic and electric fields. Destruction of data on the memory in the PLC may also take place due to cosmic rays. Destruction of data of the former type takes place normally in units of several bits, while that of the latter type often takes place in units of single bits.

It now goes without saying that a PLC cannot function normally if its control is based on destroyed user data. Thus, a PLC is adapted to keep checking during its operations whether the destruction of data has not occurred. For example, a PLC is adapted to calculate a sum value of the data on its RAM and compare the calculated sum value with a preliminarily stored sum value to thereby check the presence or absence of an abnormal condition.

Explained more in detail, whenever user data are newly downloaded or modified, the values of the user data are added from its beginning to the end and the value thus obtained is saved as the sum value in another area. During an actual operation, the sum value of the user data on the RAM is calculated by portions and whenever the final sum value is obtained, this value is compared with the value previously stored. If they do not match, it is concluded that the data on the RAM have been destroyed (or a memory abnormality has occurred) for whatever reason and the system operation is stopped in order to prevent a runaway situation and an incorrect output.

The user program is formed with instruction object codes that can be understood by a dedicated IC (ASIC) capable of carrying out user programs at a high speed as well as by a multi-purpose MPU.

It is normally an ASIC that interprets the instruction object code and determines whether the command is to be carried out by the ASIC itself or by the MPU. If the ASIC detects a code that cannot be carried out either by the ASIC itself or by the MPU, this abnormal condition is communicated to the MPU. As this communication is received, the MPU concludes that the RAM storing the object code is destroyed and may proceed to stop the PLC.

After the system is thus stopped, a work to restore the memory is carried out. In order to carry out this restoration work, however, a tool such as a personal computer for transmitting and outputting user programs must be connected to the PLC but since the PLC is usually set at a deep end of a control box, it is not easy to make such a connection.

Moreover, when the sum values are compared, there is the possibility of the sum values matching accidentally although data have been destroyed, and even after an object code becomes modified due to the destruction of data, the situation may be interpreted as being normal if the codes and the ASIC after the modification are still capable of being carried out by the MPU. In other words, it is a difficult job to reliably detect a destruction of data.

In view of this problem, Japanese Patent Publication Tokkai 11-143784 (at paragraphs 0022, 0023 and 0034 and FIGS. 1-3), for example, has disclosed a display device for a programmable controller. According to the disclosure therein, backup data with the same contents as the user data stored in the memory of the PLC are stored in the display device. When power is switched on and at specified time intervals thereafter, the presence or absence of destruction of data stored in the memory of the PLC is checked and if a destruction is found to be present, a restoration work on the memory of the PLC is carried out on the basis of the backup data stored in the display device. It also has the function of logging data on disagreement and displaying their contents. The examination for presence or absence of destruction is carried out by sequentially retrieving the backup data stored in the memory inside the display device for PLC backup and the PLC data in the memory of the PLC, comparing them by using a work memory within the display device and concluding that there was a destruction of data if there is a disagreement between the PLC backup data and the PLC data. The destroyed data portion is downloaded to the PLC to carry out a restoration work.

There is a problem with this method, however, because the display device is at a relatively distance position away from the PLC and is connected through a network. Accordingly, the memory of the PLC is read out through the network and hence the readout operation cannot be carried out sufficiently frequently. Thus, aforementioned Japanese Patent Publication Tokkai 11-143784 teaches that this be carried out only periodically at specified time intervals after power is switched on, without clearly stating what these specified time intervals might be. From the description of the specification as a whole, it may be imagined that they are fairly long time intervals. If so, they may be longer than the intervals at which prior art checking methods by way of sum values may be carried out and it is difficult to detect a destruction of data immediately.

With a method of detecting an abnormal occurrence by a display device and downloading correct data to the PLC on the basis thereof, however, a delay is involved in the communication of the abnormality to the PLC and it is usually necessary to stop the PLC temporarily for the restoration work by downloading data from the display device. This makes it difficult to carry out a real-time restoration of the memory.

Even with a checking method by means of sum values, furthermore, the user program as a whole cannot be checked for each cycle of the cyclically operating PLC. Thus, calculations are carried out sequentially in parts and a sum value is obtained by summing up the results of such partial calculations. In other words, there is a relatively large time lag from the moment when a destruction of data takes place until it is actually detected.

SUMMARY OF THE INVENTION

It is therefore an object of this invention to provide a PLC unit capable of quickly and accurately detecting the destruction of memory data and automatically restoring the memory while continuing the operation of the PLC when a destruction is detected, as well as such a method of automatically restoring a memory.

A unit embodying this invention is for a programmable controller carrying out a cyclic operation including common, calculation, I/O refresh and peripheral service processes and may be characterized as comprising a user program memory storing a user program to be read out for carrying out the calculation process, a backup memory storing data with the same contents as the user program stored in the user program memory, an abnormality detector for detecting a memory abnormality in the user program stored in the user program memory while the cyclic operation is being carried out, and a restoration device for restoring, if the abnormality detector has detected an abnormality, a data portion where the abnormality was detected by the abnormality detector with a corresponding data portion in the backup memory. The cyclic operation is continued after the data portion has been restored from the command that includes this restored data portion. The aforementioned user program memory may be referred to also as the user memory.

What was referred to above as the abnormality detector may take different forms. For example, it may be adapted to compare the contents of the backup memory and the user program memory at a specified timing and to judge that the memory is abnormal if a disagreement is detected as a result of the comparison. The specified timing may be once every cycle or once every several cycles. The contents to be compared may include the user program and the parameter area.

The user program serving as a content for comparison may, for example, be one created by the user in a control program language such as the ladder language by using a tool such as a personal computer and converted into a code (object code) that can be carried out by the PLC. Examples of data to be stored in the parameter area include data related to the system setting by the PLC, data for setting network communication and data that are not changed in the execution mode of the user program.

Comparison need not be made over all of the data of the objects of comparison (such as the user program and the parameter area) within one cycle. Comparison may be made in parts such that several cycles are carried out before all of the objects of comparison are checked for abnormality.

As another example, the calculation process in the cyclic operation may be carried out as the ASIC reads out sequentially the object codes comprising the user program stored in the user program memory and the aforementioned abnormality detector detects a memory abnormality if the object code read out by the ASIC disagrees with a preliminarily specified object code.

In this example, it is preferable for the abnormality detector to be provided with the function of identifying the portion where the memory abnormality has been generated, when the object code read out by the ASIC and the preliminarily specified object code disagreed and a memory abnormality has been detected, by comparing the contents of the backup memory and the user program memory on the basis of the data of address where the object code in which the ASIC has detected the abnormality and thereby detecting the position of disagreement.

As still another example, the abnormality detector may preferably be adapted to check the entirety of the user program in the user program memory within one cycle, to temporarily save the data in a specified area of the I/O memory storing the I/O data if there is no abnormality and to repair the user program and to restore the I/O memory based on the temporarily saved I/O data if an abnormality has been detected.

Even if it is arranged such that the entirety of the user program in the user program memory is checked within one cycle, the memory restoration of the user program may be carried out without saving and restoring the I/O data as explained above. The memory check in this case may be carried out in different ways such as by checking the sum value or by a comparison between the user memory and the backup memory.

This invention relates also to a method of automatically restoring a memory of a unit for programmable controller carrying out a cyclic operation including common, calculation, I/O refresh and peripheral service processes. The method presupposes that the unit is provided with a user program memory storing a user program to be read out for carrying out the calculation process and a backup memory storing data with the same contents as the user program stored in the user program memory. According to the method, an abnormality detection process is carried out to thereby detect a memory abnormality in the user program stored in the user program memory while the cyclic operation is being carried out and, if a memory abnormality is detected by carrying out the abnormality detection process, a data portion corresponding to incorrect data at the detected memory abnormality is read out of the backup memory and this data portion is written in the user program memory to thereby correct the incorrect data and restore the memory. The cyclic operation is continued after the incorrect data are thus corrected from the command that includes the data portion including the corrected data.

In the above, the abnormality detection process may be carried out preferably by comparing the contents of the backup memory and the user program of the user program memory at a specified timing and detecting abnormality if a disagreement results by comparison.

Also in the above, the calculating process is carried out by an ASIC which sequentially reads out object codes of the user program stored in the user program memory and the abnormality detector serves to detect abnormality if the object codes read out by the ASIC disagree with preliminarily specified object codes. If abnormality is detected by carrying out the abnormality detection process, the ASIC can identify the position where the abnormality occurred by comparing contents of the backup memory and the user program memory based on address data of where the object codes are stored. The user program memory can be restored by retrieving from the backup memory the data at the identified position.

Further in the above, the abnormality detection process may comprise the steps of checking the entirety of the user program in the user program memory within one cycle, temporarily saving the data in a specified area of the IO memory storing the I/O data if there is no abnormality and repairing the user program and restoring the IO memory based on the temporarily saved I/O data if an abnormality has been detected.

Since speed is an important factor in the PLC control (that is, the aforementioned calculation process), use is made of a memory capable of high-speed operations at the time of carrying out the calculation process. The calculation speed can be improved by using such a memory as the user program memory. Such memories, however, have a large standby current and would require a large number of battery cells if it were desired to store data of a size as large as that of a user program for an extended period of time. It is therefore not practically feasible to use them for a PLC unit from the point of view of both structure and price. Thus, since such a memory cannot hold data when power is switched off, the common practice is to store the user program separately in a non-volatile backup memory and to transfer it from the backup memory to the user memory when power is switched on for carrying out the cyclic processes. In other words, the same content of the user program data is stored both in the user program memory and the backup memory as power is switched on.

According to this invention, therefore, it is the unit for the PLC that checks for an abnormal condition of the memory and, if data of the user program memory are damaged to cause a memory abnormality, corresponding data in the backup memory are used to replace the damaged part with a rewritten part as a memory restoration work. Thus, the user program data on the user program memory become corrected and the PLC can continue its operations. Since the transfer of the user program from the backup memory to the user program memory is an internal operation, the restoration of the user program memory can be accomplished instantaneously while the cyclic operations are being carried out and the cyclic operations can be continued after the data are corrected. In other words, the user program memory can be automatically restored without stopping the PLC.

Although three methods have been mentioned for the detection of memory abnormality (which are (1) by comparing the user program between the user program memory and the backup memory and checking whether or not they agree, (2) by determining whether object codes are comprehensible to the ASIC, and (3) by checking the sum value for judgment), only one or any combination of a plurality of these methods may be incorporated. If still another method is present, such a new method may also be incorporated.

Referring to the above, it is preferable to incorporate both (1) and (2). While it is not desirable to allow the time for one cycle of operations to become too long, processes corresponding to only a few bytes (to be determined according to the capability of the PLC) can be carried out in once cycle by the method of comparing data according to (1). Thus, if data at a certain address are determined to be normal by this comparison of data and thereafter a data error occurs at this address, a condition that is undesirable to the PLC continues to exist until the next comparison is made. If the method of (2) is additionally incorporated and if the data error is where object codes of the user program are stored, however, the error is detected when the ASIC carries out the user program (or when the object codes are read out). This means that the abnormal condition can be detected sooner and hence the reliability of the PLC is improved.

It is to be recognized, however, that although it takes a plurality of cycles by the method of (1) to check all of the data because the checking takes place in units of only several bytes, if the portion containing the abnormal condition is checked, the condition can be detected within that cycle.

It is also to be recognized that the invention also includes methods whereby the entire user program of the user program memory is checked within on cycle. In this case, either of the methods (1) and (2) may be used and the method of (3) becomes one of effective methods.

DETAILED DESCRIPTION OF THE INVENTION

Figure 1:
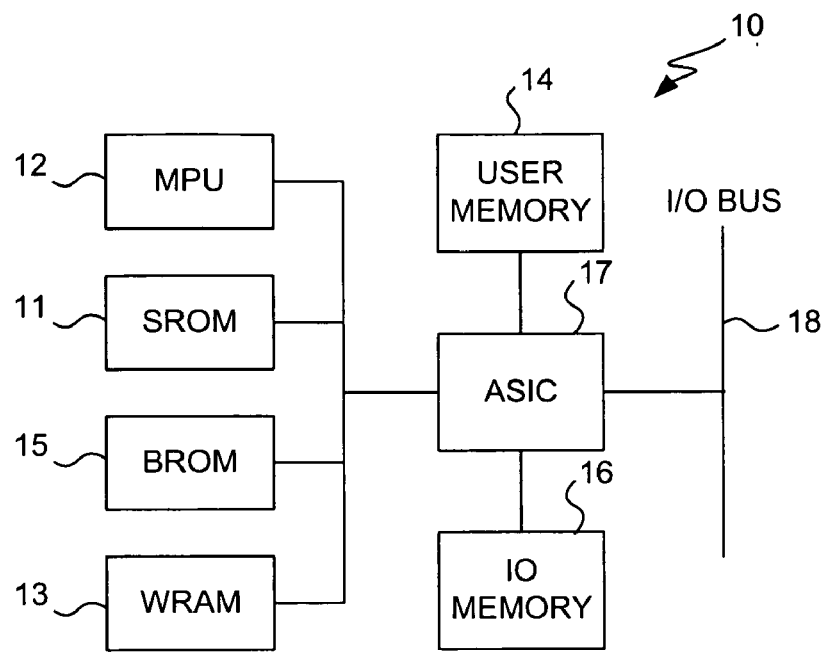
FIG. 1 is a block diagram of a unit embodying this invention.

FIG. 1 shows the structure of a CPU unit 10 for a PLC embodying this invention. A system program (firmware) is stored in a system memory (SROM) 11 comprising a flash memory device and is adapted to be called into the MPU 12 which serves to carry out various processes according to the program by using a work memory (WRAM) 13 as it becomes necessary.

During the operation, a user program, which is one of user data, is stored in a user memory 14 serving as the user program memory. The user memory 14 is formed with a SRAM (which is a high-speed RAM) and cannot keep its contents when power is switched off. For this reason, another user program with the same content is stored in a backup memory 15 formed with a flash memory device capable of holding its contents even while power is switched off. When power is switched on, the user program stored in the backup memory 15 is transmitted to the user memory 14.

I/O data and parameters are stored in IO memory 16. The IO memory 16 is also formed with a SRAM but is provided with battery cells according to this example and hence maintains its memory contents even when power is switched off.

Instruction object codes of the user program stored in the user memory 14 are sequentially called by an ASIC 17. The ASIC 17 analyzes the retrieved instruction object codes and carries out the commands. When these commands are executed, the IO memory 16 is accessed whenever necessary in order to read and write I/O data and obtain parameters. The I/O data may be transmitted to and/or received from different units as well as other I/O apparatus through an I/O bus 18.

The ASIC 17 is adapted to detect abnormality (that is, to judge that there is an abnormal condition) if a instruction object code is analyzed but is found to be an incorrect code which is incomprehensible to it and to inform the MPU 12 to this effect. The structure and the function described above are basically the same as the prior art and hence no detailed explanation will be presented. A PLC is formed by connecting units of different kinds such as a power source unit and an I/O unit in addition to the CPU unit 10 described above through a bus.

Figure 2:
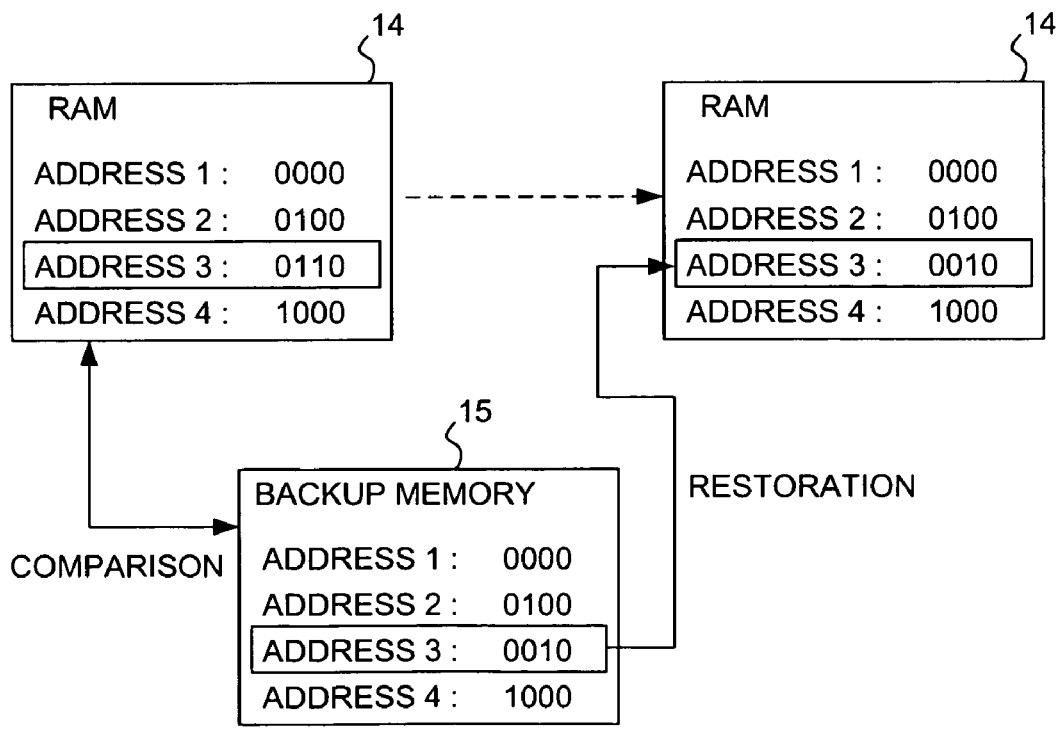
FIG. 2 is a drawing for explaining the principle of its operations.

As shown in FIG. 2, the MPU 12 serves to compare the data of the user program stored in the user memory 14 with those of the user program in the backup memory 15 ("COMPARISON") to determine whether or not their contents match. If they match, it is judged that data in the user memory 14 are not destroyed and the execution of the user program of the user memory 14 is directly continued. If a disagreement is detected such as Address 3 in the example of FIG. 2, it is judged that there are destroyed data in the user memory 14 and the corresponding data item (at Address 3) stored in the backup memory 15 is written over ("RESTORATION") in the user memory 14 such that the user memory 14 will contain correct data. The PLC is thus now able to continue its operations. The aforementioned comparison process between the two memories may be carried out in many different ways, such as by reading out the data to be compared, saving them in a work memory (WRAM) 13 and comparing them there.

The ASIC 17 is also adapted to inform the MPU 12 of an abnormal condition if an incomprehensible code (not executable either by the ASIC 17 or the MPU 12) is encountered during the execution of a command. When the MPU 12 acknowledges receipt of such information based on the detection of an incomprehensible code, the user memory 14 is corrected and the corrected code is written again in the ASIC 17. In response, the ASIC 17 reads out and executes the correct code. In this manner, the memory can be automatically restored without stopping the PLC.

In the example shown in FIG. 2, the instruction object code at Address 3 is incomprehensible. In this example, the ASIC 17 reads out the instruction object codes sequentially in the order of their addresses, analyzes the contents of their commands and executes them. In other words, the command based on the instruction object code stored at Address 1 is executed first and then the command of the instruction object code stored at Address 2 are executed next. When the instruction object code at Address 3 is read out thereafter in order to execute it, however, it is found to be incomprehensible and hence the abnormality is communicated to the MPU 12 without executing this command.

When this communication is received, the MPU 12 corrects the content of Address 3 of the user memory 14 with that of corresponding Address 3 of the backup memory 15 and causes the ASIC 17 to read out the instruction object code in Address 3 again. In response, the ASIC 17 executes the corrected command in Address 3. Thereafter, the instruction object code in Address 4 is read out as usual and its command is executed. In this manner, whenever an abnormality is detected during the operation of a user program, the content of the user program can be automatically restored without stopping the PLC and the execution can be resumed with a correct content.

Next, details of operations described above for the detection of abnormality and automatic correction of the memory are explained. It is firstly to be reminded that the PLC is adapted to carry out a common process, a calculation process (that is, the execution of the user program), an I/O refresh process and the peripheral service process repeatedly in a cyclic manner. Thus, the aforementioned process for checking an abnormal situation is also carried out in a cyclic manner. There are both a method of checking the entirety of the user program in the user memory 14 in one cycle and another method for doing it in parts over several cycles.

If the checking is done in parts over several cycles, the user program in the user memory 14 is divided into several (a plural N-number of) blocks, each block being checked in one cycle such that the checking of the entire user program will be completed in N cycles. If an abnormal condition is detected in any of the blocks, only the block that is being checked in that cycle is automatically restored. The operations by the MPU in this case is shown by the flowchart of FIG. 3.

Figure 3:
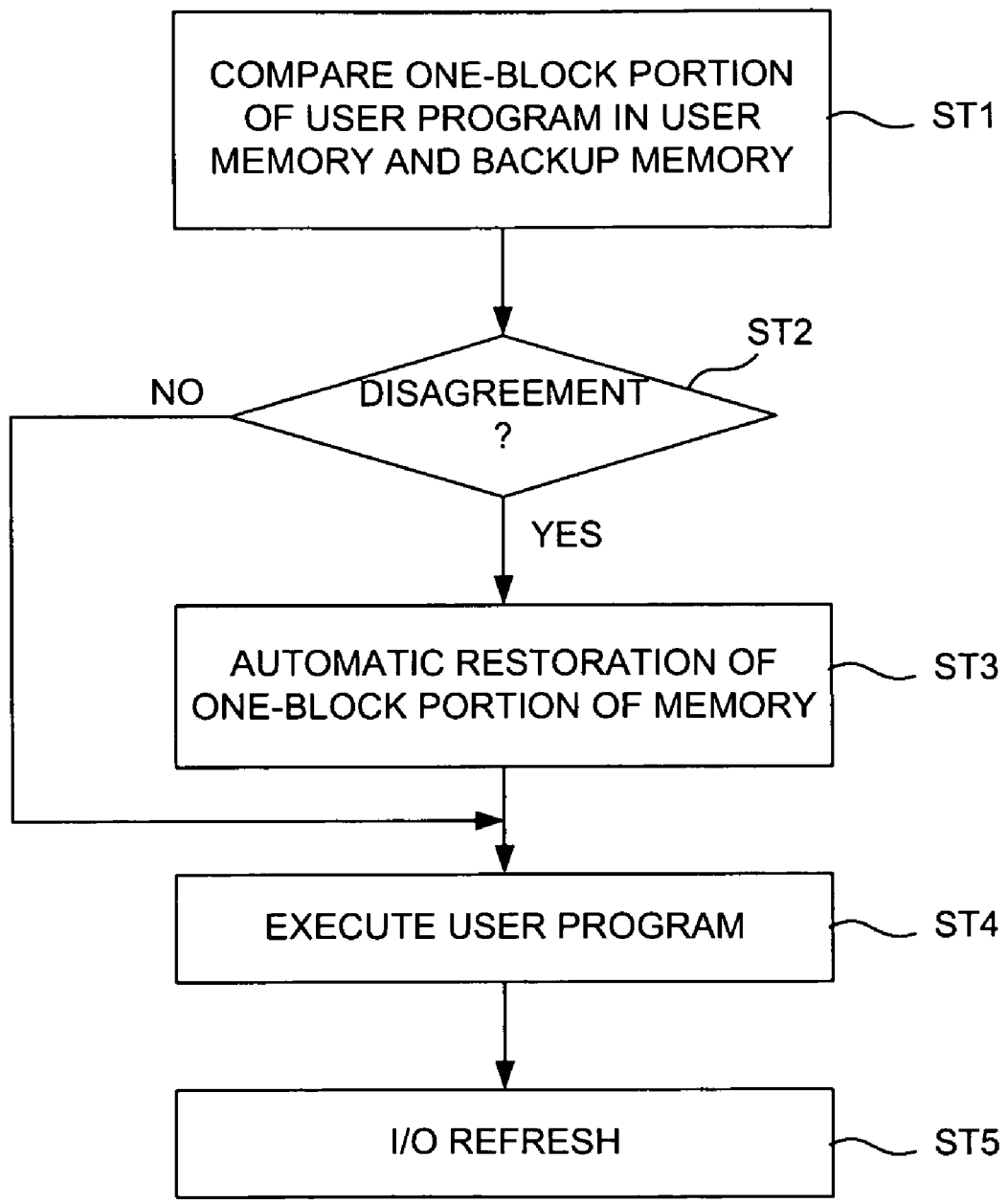
FIGS. 3-9 are flowcharts for various operations of the MPU.

With reference to FIG. 3, a memory check is carried out for a one-block portion of the user program of the user program 14 divided into a plurality of parts (Step ST1) by comparing the user memory 14 and the backup memory 15. If there is no disagreement (NO in Step ST2), the situation is considered to be normal. If a disagreement is detected (YES in Step ST2), it is concluded that the memory has been destroyed and the disagreeing portion within the block being processed currently is automatically restored (Step ST3). Since it is reasonable to conclude from the stability of memories that the agreement came about because of destroyed data on the side of the user memory 14, the corresponding data item is read out of the backup memory 15 and written into the user memory 14.

This, however, is not intended to limit the scope of the invention. It is preferable to initially carry out a sum-value check on the user program in the backup memory 15 so as to ascertain that the contents of the backup memory 15 are correct before the data item therefrom is written into the user memory 14. This is because the possibility of an data error in the non-volatile device for the backup memory comprising the backup memory is not exactly zero.

After the abnormal portion has been thus corrected or if there was no disagreement, the normal cyclic operation is resumed (Step ST4) with the ASIC 17 reading out sequentially the instruction object codes of the user program from the user memory 14, analyzing the command codes and executing the commands. This is followed by the execution of the I/O refresh process (Step ST5).

In summary, the program is executed in the case of an abnormal situation only after it is automatically restored on the basis of the backup data stored in the backup memory 15 within the CPU unit 10. Thus, a continuous operation is possible without stopping the PLC as it was conventionally necessary.

It is to be noted with reference to FIG. 3 that presence and absence of an abnormal condition may be continuously monitored throughout the process of Step ST4 while the user program is being executed such that the automatic restoration can be effected whenever an abnormal situation is detected. As explained above, whenever the ASIC 17 reads out a instruction object code which is incomprehensible to itself, it is concluded that an abnormal condition has occurred and this fact is communicated. On this basis, the MPU 12 compares the user memory 14 with the backup memory 15 and, after an abnormal position is identified, the data at the corresponding position are corrected. Codes that are incomprehensible to the ASIC 17 are not executed and the ASIC 17 carries out the execution only after the correction is made, thereby automatically restoring the memory with damaged data without stopping the PLC. When the ASIC 17 reports on an abnormal condition, the MPU 12 learns therefrom the address of the abnormal condition and hence has only to check the neighborhood of this address for data of the specified size. Thus, the position of the abnormality can be detected quickly. Details of this process will be described below.

In this example, as explained above, the checking of the entirety of the user program is completed only once in a plurality of cycles because only a portion of the user program data is checked in each cycle. Since it is not the sum value that is checked as conventionally done, however, the position of abnormality can be quickly detected because the block containing that position comes to be checked soon. Moreover, the memory restoration is done only at the abnormal position and since this is all done automatically, the restoration operation can be completed much more quickly than possible previously.

Explained further in detail, if the user program of the user memory 14 is divided into N blocks, it takes N cycles to complete the checking of the entire user program but if an abnormal condition has occurred in the nth block (n<N), this can be detected only after N cycles by the conventional method by checking the sum value and yet the position of occurrence of the abnormality cannot identified. Thus, the entire user program had to be updated according to this prior art technology and this had to be done by stopping the PLC.

Figure 4:
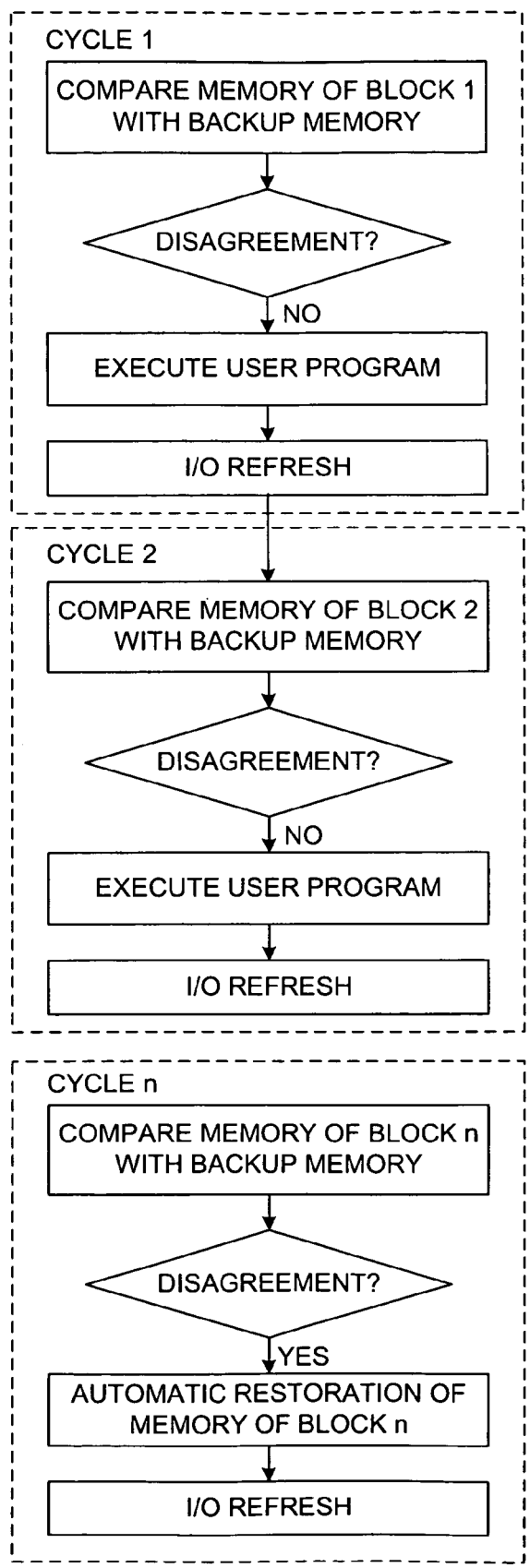

According to this invention, by contrast, the checking operations are carried out in units of blocks, as shown in FIG. 4, such that normal operations are continued until the (n-1)st cycle since there is no abnormality in the memory. As disagreement is detected in the nth cycle, the memory in the nth block is automatically corrected and the user program is executed directly without stopping the PLC. In summary, the abnormal condition can be detected in the nth cycle (sooner than the Nth cycle) and automatically corrected to the original condition without stopping the PLC, allowing the operation of the PLC.

Although FIG. 3 shows an example wherein Steps ST1-ST5 are repeated, this is not intended to limit the scope of the invention. The checking of the memory need not be carried out in each cycle but may be done once in a specified number of cycles. Moreover, the conventional checking routine by way of checking the sum value by stopping the PLC in the case of an abnormal situation may be incorporated. In such an example, it may be arranged such that such a conventional routine and the checking method of this invention explained above by comparing the data of the user memory 14 and the backup memory 15 are selectively executed.

Figure 5:
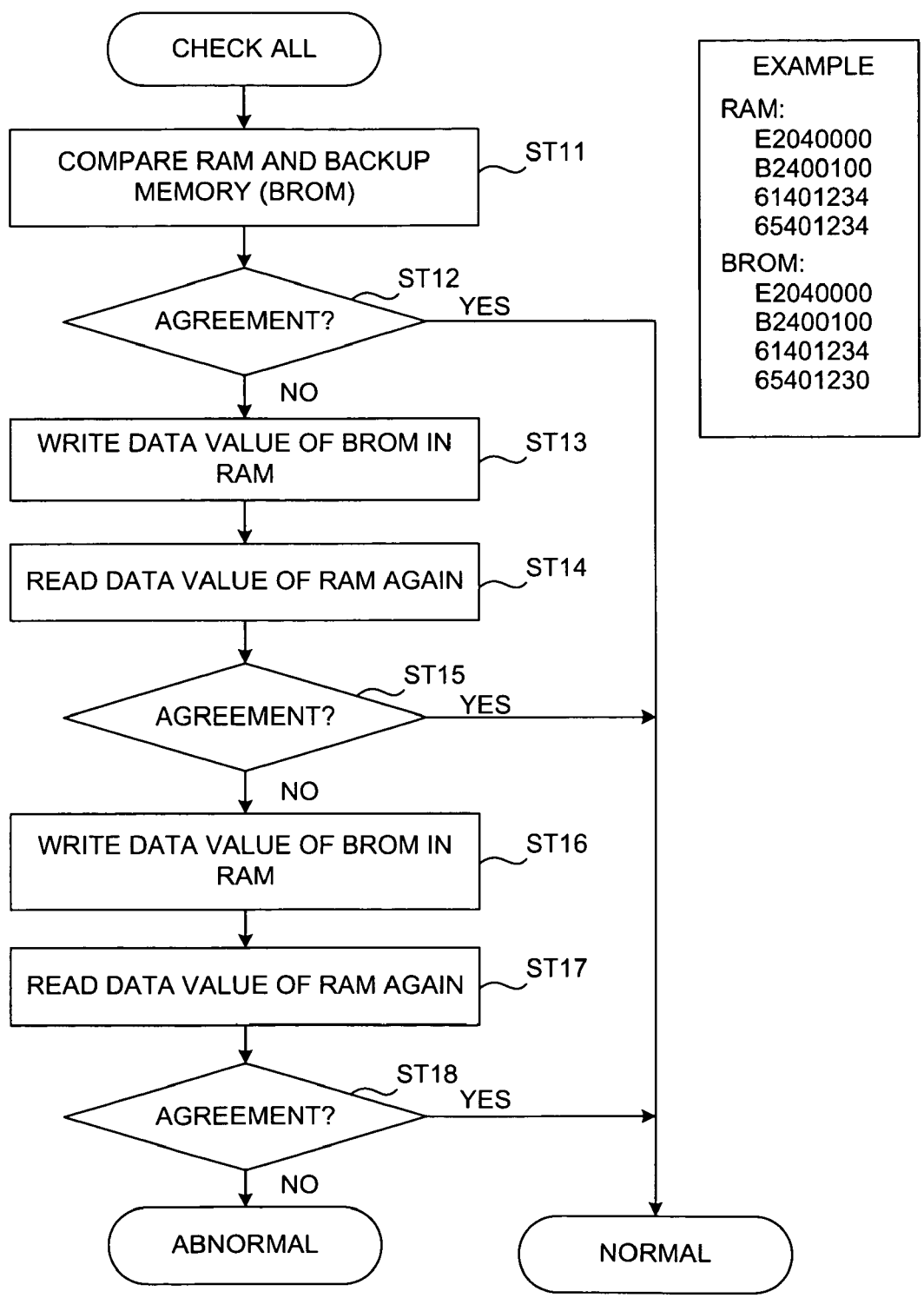

Next, the memory check routine and the associated routine for the automatic restoration are explained more in detail. FIG. 5 shows Step ST2 of FIG. 3 wherein the user memory (RAM) 14 and the backup memory (BROM) 15 are compared first (Step ST11). Data to be compared in this step are only a portion of the user data, say, of 4 bytes. If they are found to agree (YES in Step ST12), the routine is directly terminated. If they are found not to agree (NO in Step ST12), data in the backup memory 15 at the corresponding part where the disagreement was found are written over the data at the corresponding part of the user memory 14 (Step ST13). In other words, the comparison is made between corresponding parts of the data and hence presence or absence of an abnormal condition can be ascertained regarding the compared portions.

This is how the restoration work can be carried out. According to the illustrated example of this invention, however, data from the user memory 14 are read out again (Step ST14) to be compared with the content of the backup memory (BROM) 15 (Step ST15) to make the restoration work more dependable. If the operations in Step ST13 was properly executed, the result of this comparison will be positive (YES in Step ST15) and the routine is terminated. In the case of a write-in error or the like resulting in erroneous restoration (NO in Step ST15), however, Step ST13 is repeated (Step ST16) and data from the user memory 14 are read out again (Step ST17) and compared with the content of the backup memory (BROM) 15 (Step ST18). If the result of this second comparison is negative (NO in Step ST18), there is a high possibility of a hardware error in the memory, and the routine is concluded and the PLC is stopped.

If the data stored in the user memory (RAM) 14 and the backup memory (BROM) are as shown in the box in FIG. 5, for example, the disagreement in the fourth data items is corrected in Step ST13 or ST16. If the step of checking the sum value of the backup memory is to be included, it is preferable to be carried out before Step ST11 is executed.

Figure 6:
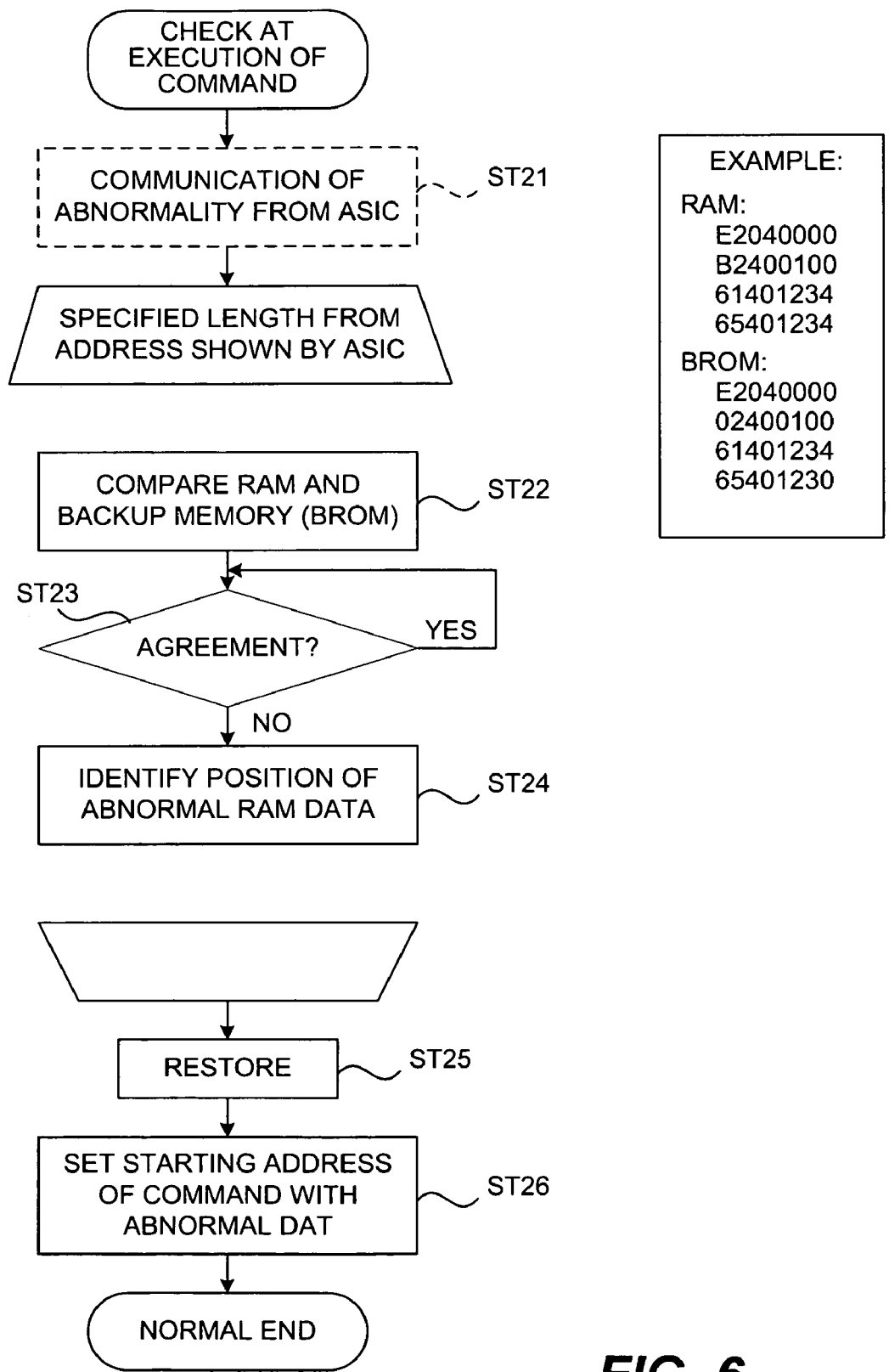

FIG. 6 shows Step ST4 of FIG. 3 wherein the MPU 12 is waiting for a communication from the ASIC 17 regarding any received code found to be incomprehensive to itself (Step ST21). Upon receiving this communication and becoming aware of the occurrence of abnormality, the MPU 12 obtains the address possessed by the ASIC 17 and compares the user memory (RAM) 14 with the backup memory (BROM) 15 regarding data extending by a specified length in both directions from the communicated address. If the position of data not in agreement is detected, this is identified as the abnormality position and the detection routine is concluded (Steps ST22-ST24). In the above, the specified length may be set equal to the maximum length of the instruction object code since the flag at the start of each instruction object code may be changed.

Thereafter, the restoration operation is carried out by reading the data at the abnormal position out of the backup memory 15 and writing them over the user memory 14 (Step ST25). This restoration operation, too, is preferably carried out more than once, as explained above with reference to FIG. 5, in order to make certain that correct data have properly been written in.

After the step of automatic restoration is thus completed, the starting address of the command including the abnormal data is set for the ASIC 17 (Step ST26). This enables the ASIC 17 to execute the command which could not be carried out because of the detection of abnormality and this is done under the corrected command with correctly restored data.

Figure 7:
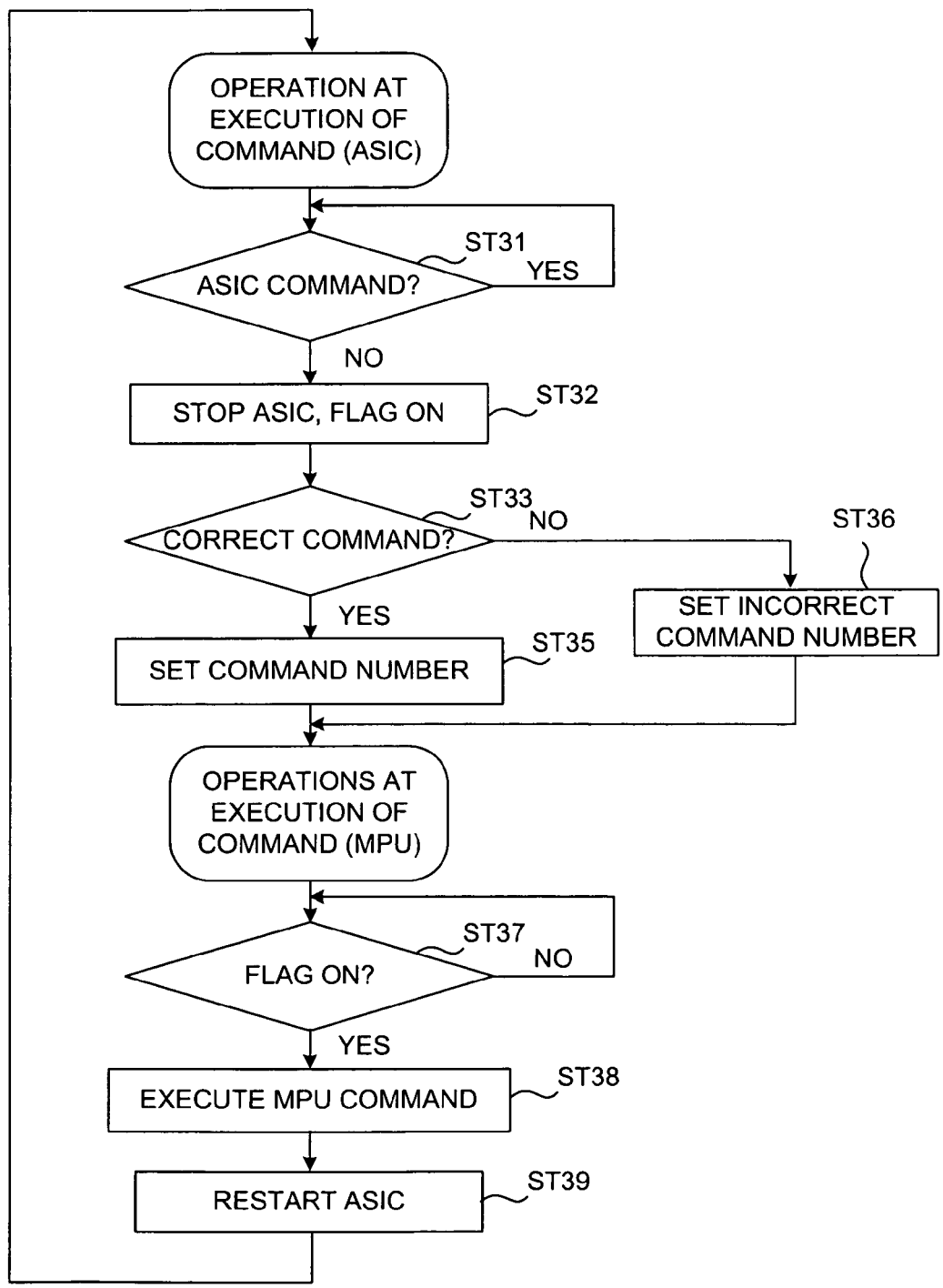

FIG. 7 shows the processes for the execution of a command. If the received command is a correct kind (or "ASIC command" executable by the ASIC 17) (YES in ST31), the command is executed. If it is not a correct command (not executable by the MPU) (NO in Step ST31), the ASIC 17 is stopped and a flag (MFN-STP flag) is switched on (Step ST32).

It is determined next whether the command is of a correct kind or not (Step ST33). In the case of a command of a correct kind (YES in Step ST33), its command number is set in MFN register (Step ST35). In the case of a command of an incorrect kind (NO in Step ST33), an "incorrect command number" is set in the MFN register (Step ST36).

In the meantime, the MPU 12 keeps monitoring whether or not the MFN-STP flag has been switched on (Step ST37). If the flag is switched on (YES in Step ST37), it understands that the ASIC 17 has stopped and the command is executed by the MPU 12 (Step ST38). In other words, if the determination in Step ST33 was "correct command", the command is executed at the specified position, that is, the command number set in the MFN register is carried out. In the case of an incorrect command (such as if an incorrect command number is set in the MFN register), the automatic restoration of memory is executed by carrying out the routine according to the flowchart of FIG. 5. The ASIC 17 is restarted thereafter (Step ST39) and the routine returns to Step ST31 to execute the user program.

Figure 8:
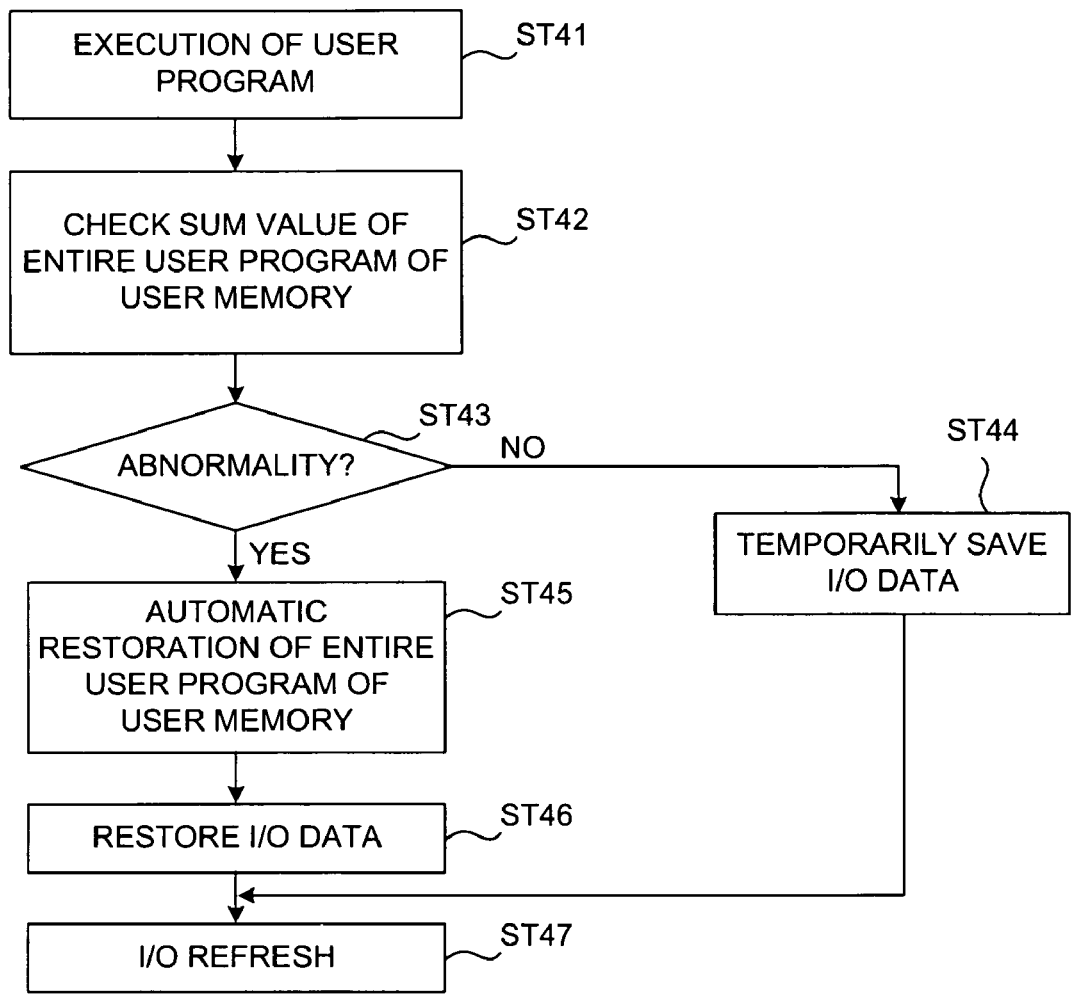

Although the invention has been described above with an example wherein the user program of the user memory 14 and the user program of the backup memory 15 are compared in parts and over a plurality of cycles, this is not intended to limit the scope of the invention. In the case where the entirety of the user program of the user memory 14 is to be checked in one cycle, the checking in Step ST1 of FIG. 3 is made over the entirety of the user program of the user memory 14. As still another example, it may be arranged such that the sum value of the entire user program is checked in one cycle. FIG. 8 shows an example of such process.

In the routine shown in FIG. 8, the user program is carried out first (Step ST41). During this calculation process, the code check as explained above may be carried out. Next, the sum value of the entire user program of the user memory 14 is carried out (Step ST42). If no abnormality is detected (NO in Step ST43), the current I/O data on the IO memory 16 are read out and saved on the backup memory (set, for example, on WRAM 13) (Step ST44), and then the I/O refresh process is carried out (Step ST47).

If an abnormal situation is detected (YES in Step ST43), automatic memory restoration of the entire user program of the user memory 14 is carried out (Step ST45). Explained more in detail, this may be done by the MPU 12 or the ASIC 17 comparing the user programs of the user memory 14 and the backup memory 15 and, if a position of disagreement is detected, replacing the data at the position of disagreement on the user memory 14 with the corresponding data on the backup memory 15. As another example, this may be done by reading out the user program stored on the backup memory 15 and writing it into user program 14 so as to thereby rewrite the entire user program. Since the abnormal position cannot be identified by the method by checking the sum value, the entirety of the user program is restored by this method.

Next, restoration of the I/O data is carried out (Step ST46) by reading out the IO data previously saved in the backup memory 15 and writing them in the IO memory 16. The I/O refresh process is carried out thereafter (Step ST47).

Besides the I/O data, the other data on the IO memory (such as the data which are not the object of the I/O refresh process such as parameters) may be temporarily saved and restored.

Figure 9:
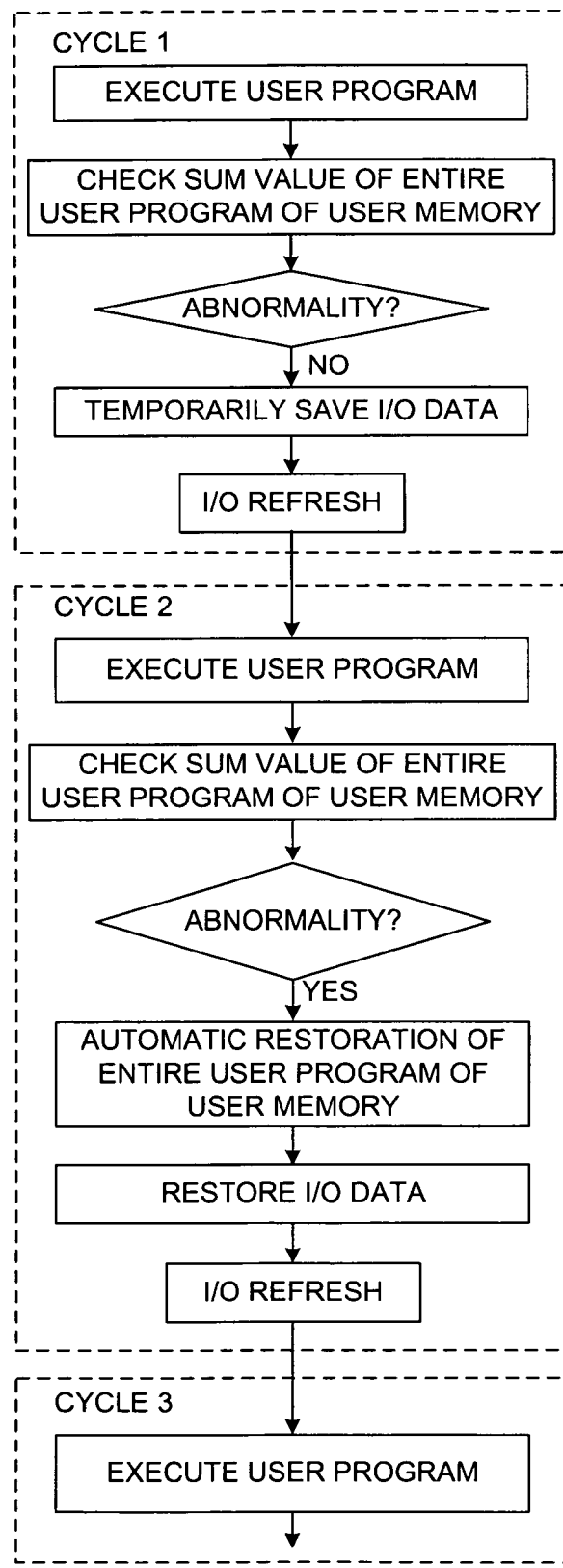

FIG. 9 shows an example of actual routine for checking the entire user program in one cycle. After the user program is executed, the entire user program of the user memory 14 is checked and if there is no abnormality, the I/O refresh process is carried out after the I/O are saved. If an abnormal situation is detected, restoration of the user memory 14 and restoration of the I/O memory on the basis of the I/O data are carried out.

In the above, it was the user program that was checked such as when the user program of the user memory 14 and that of the backup memory 15 were compared, but it is preferable to save set values such as the parameters stored in the IO memory 16 on the backup memory 15 and, when a memory check is done, to check also the IO memory 16 to determine presence or absence of destroyed data (abnormality in the memory) and to carry out automatic restoration of the memory if an abnormal condition is detected.

The comparison between the user program of the user memory 14 and the user program of the backup memory 15, as mentioned above, is carried out by comparing the data in these programs where they are stored. When the user program is stored in the user memory 14 and the backup memory 15, the calculated sizes of the areas for saving them may also be saved and such that the data on these area sizes may be compared. In this case, the backup memory 15 may be a memory already contained in the unit or a detachable memory such as a memory card.

As explained above, destruction of data in memory can be quickly and accurately detected and, when it is detected, the memory can be automatically restored according to this invention while the operation of the PLC is continued.

As another example, two (first and second) user programs corresponding to the same object code may be stored at different areas within the user memory 14. In such a case, as the PLC starts to carry out the program, the ASIC 17 reads out the two programs in units of commands and compares them. In the case of an agreement, the command is carried out. In the case of a disagreement, the ASIC 17 reports to the MPU 12 on the abnormality. Upon receiving this report, the MPU 12 restores the user program by rewriting the incorrect data in the two user programs by using the data at the address on the backup memory 15 corresponding to the address at which the disagreement was found. After the user program has been restored, the MPU 12 allows the ASIC 17 to resume its comparison process. This process by the ASIC 17 and the MPU 12 is continued from the beginning to the end of the user program. Such a process makes it possible to carry out a program through the object code with no incorrect data.

Regarding the example described above, the two (first and second) user programs need not both be saved on the user memory 14. They may be saved on separate memories accessible to the ASIC 17.

As still another example, the PLC unit may be adapted to select different modes of operations, depending upon whether or not the aforementioned function of automatically restoring a plurality of memories. Normally, a unit for a PLC is provided with a memory for setting its operations. According to this example, a new area is provided to the memory for specifying modes of operations for carrying out and not carrying out the automatic memory restoration. If the mode for carrying out the automatic memory restoration, the user is also allowed to specify which of a plurality of automatic memory restoration functions is to be carried out. The user of the PLC unit may use a suitable tool before operating the unit to set specified data in this memory area to indicate whether the automatic memory restoration function is to be used or not, and if it is to be used, which of the automatic memory restoration functions is to be used.

The PLC unit checks the area prior to the execution of the user program to ascertain the mode of operations for the automatic memory restoration specified by the user. If it is ascertained that the user has specified the mode not using the function for automatic memory restoration and an abnormal situation is encountered during its operation, the occurrence of the abnormal situation is reported and its operation is stopped without carrying out its automatic memory restoration function. If it is ascertained that the user has specified the mode for using the function for automatic memory restoration and an abnormal situation is encountered during its operation, it undertakes to carry out the specified automatic memory restoration operations. Details of how the automatic memory restoration is carried out will be omitted because of the methods described above may be utilized.

Regarding the above, the specification of the mode for carrying out the automatic memory restoration need not be provided by setting certain data in a specified memory area within this PLC unit. Alternatively, this may be done by placing a dedicated command for specifying the mode for the automatic memory restoration at the beginning of the user program such that this command can be carried output to select the operation mode. A PLC unit thus arranged may be caused to carry out the operations of its automatic memory restoration only if the system allows an extension of time for one cycle associated with this operation for the automatic memory restoration but not to do so in the case of a system not allowing such an extension of time. In other words, a PLC unit thus arranged is usable both for systems that allow such an extension of time for one cycle associated with the execution of the automatic memory restoration and for systems that do not allow such an extension of time.

What is claimed is:

1. A unit for a programmable controller carrying out a cyclic operation including common, calculation, I/O refresh and peripheral service processes, said unit comprising:
  a user program memory storing a user program to be read out for carrying out said calculation process;
  a backup memory storing data with the same contents as said user program stored in said user program memory;
  an abnormality detector for detecting a memory abnormality in said user program stored in said user program memory while said cyclic operation is being carried out; and
  a restoration device for restoring, if said abnormality detector has detected an abnormality, a data portion where said abnormality was detected by said abnormality detector with a corresponding data portion in said backup memory; wherein said cyclic operation is continued from a command including said data portion after said data portion has been restored.

2. The unit of claim 1 wherein said abnormality detector serves to carry out a comparison between contents of said backup memory and said user program memory at a specified timing and to detect abnormality if there is a disagreement by said comparison.

3. The unit of claim 1 wherein said calculating process is carried out by an ASIC which sequentially reads out object codes comprising said user program stored in said user program memory and said abnormality detector serves to detect abnormality if said object codes read out by said ASIC disagree with preliminarily specified object codes.

4. The unit of claim 3 wherein, said ASIC is adapted to identify, when said object codes read out by said ASIC disagree with preliminarily specified object codes and said abnormality detector detects abnormality, and to identify the position where the abnormality occurred by comparing contents of said backup memory and said user program memory based on address data of where said object codes are stored.

5. The unit of claim 1 wherein said abnormality detector is adapted to check all of said user program of said user program memory in one cycle, to temporarily save the data in a specified area of the IO memory storing the I/O data if there is no abnormality and to repair said user program and restore said IO memory based on the temporarily saved I/O data if an abnormality has been detected.

6. The unit of claim 1 adapted to function selectably in one of a first mode of operation and a second mode of operation, said restoration device being allowed to be used if said first mode of operation is set, said cyclic operation being stopped and said restoration device not being used if said abnormality detector detects a memory abnormality while said second mode of operation is set.

7. A method of automatically restoring a memory of a unit for programmable controller carrying out a cyclic operation including common, calculation, I/O refresh and peripheral service processes, said method comprising the steps of:
  providing said unit with a user program memory storing a user program to be read out for carrying out said calculation process and a backup memory storing data with the same contents as said user program stored in said user program memory;
  carrying out an abnormality detection process to thereby detect a memory abnormality in said user program stored in said user program memory while said cyclic operation is being carried out;
  reading out of said backup memory, if a memory abnormality is detected by carrying out said abnormality detection process, a data portion corresponding to incorrect data at the detected memory abnormality and writing said data portion in said user program memory to thereby correct said incorrect data and restore said memory; and
  continuing to carry out said cyclic operation from a command including said data portion after said incorrect data are corrected.

8. The method of claim 7 wherein said abnormality detection process includes the steps of making a comparison between contents of said backup memory and said user program memory at a specified timing and detecting said memory abnormality if there is a disagreement by said comparison.

9. The method of claim 7 wherein said calculating process is carried out by an ASIC which sequentially reads out object codes of said user program stored in said user program memory and said abnormality detection process includes the steps of:
  determining whether the object codes read out by said ASIC are the same as preliminarily specified object codes; and
  detecting said memory abnormality if the object codes read out by said ASIC are not the same as said preliminarily specified object codes.

10. The method of claim 9 further comprising the steps of:
  identifying by said ASIC, when abnormality has been detected by said abnormality detection process, the position where the abnormality occurred by comparing contents of said backup memory and said user program memory based on address data of where said object codes are stored; and
  restoring said user program memory by retrieving from the backup memory the data at the identified position.

11. The method of claim 7 wherein said abnormality detection process comprises the steps of checking the entirety of the user program in said user program memory within one cycle, temporarily saving the data in a specified area of said IO memory storing said I/O data if there is no abnormality and repairing said user program and restoring said IO memory based on said temporarily saved I/O data if an abnormality has been detected.

12. The method of claim 7 wherein said user program memory stores two user programs with same contents;
  wherein the cyclic operation of calculation is carried out by an ASIC sequentially reading out object codes from either of said two user programs stored in said user program memory; and
  wherein said abnormality detection process comprises the steps of:
  comparing the object codes of said two user programs before said ASIC reads out and carried out said object codes; and
  detecting a memory abnormality if a disagreement is detecting in the step of comparing the object codes.

* * * * *